United States Patent [19]
Cox

[11] Patent Number: 4,576,037
[45] Date of Patent: Mar. 18, 1986

[54] LEAK DETECTORS

[75] Inventor: Andrew P. D. Cox, Grimsby, England

[73] Assignee: Dunlop Limited, London, England

[21] Appl. No.: 601,913

[22] Filed: Apr. 19, 1984

[30] Foreign Application Priority Data

Apr. 27, 1983 [GB] United Kingdom ............... 8311474

[51] Int. Cl.[4] ............................................. G01M 3/28
[52] U.S. Cl. .................................. 73/40.5 R; 73/49.1; 73/40.5 A
[58] Field of Search .............. 73/40.5 R, 40.5 A, 49.1

[56] References Cited

U.S. PATENT DOCUMENTS

| | | | |
|---|---|---|---|
| 3,409,897 | 11/1968 | Bosselaar et al. | 73/40.5 A |
| 3,935,567 | 1/1976 | Reynolds | 73/40.5 R |
| 4,172,379 | 10/1979 | von Tilburg et al. | 73/40.5 A |
| 4,259,553 | 3/1981 | Tanaka et al. | 73/40.5 R |
| 4,361,030 | 11/1982 | Heide | 73/40.5 R |

FOREIGN PATENT DOCUMENTS 1338318 11/1973 United Kingdom .
1355176 6/1974 United Kingdom .
1485152 9/1977 United Kingdom .

*Primary Examiner*—Thomas Wyse
*Attorney, Agent, or Firm*—Stevens, Davis, Miller & Mosher

[57] ABSTRACT

In a leak detector of a kind suitable for mounting externally of a flexible hose to detect leakage of fluid through at least a part of the hose and generate a warning signal in response thereto, test means is provided for checking the operating capability of the detector. The test means is of a kind operable from outside of the detector, for example by means of a magnet or an ultrasonic signal. Accordingly particularly when the leak detector is used in underwater situations the operating capability of the detector may readily be checked in situ.

11 Claims, 1 Drawing Figure

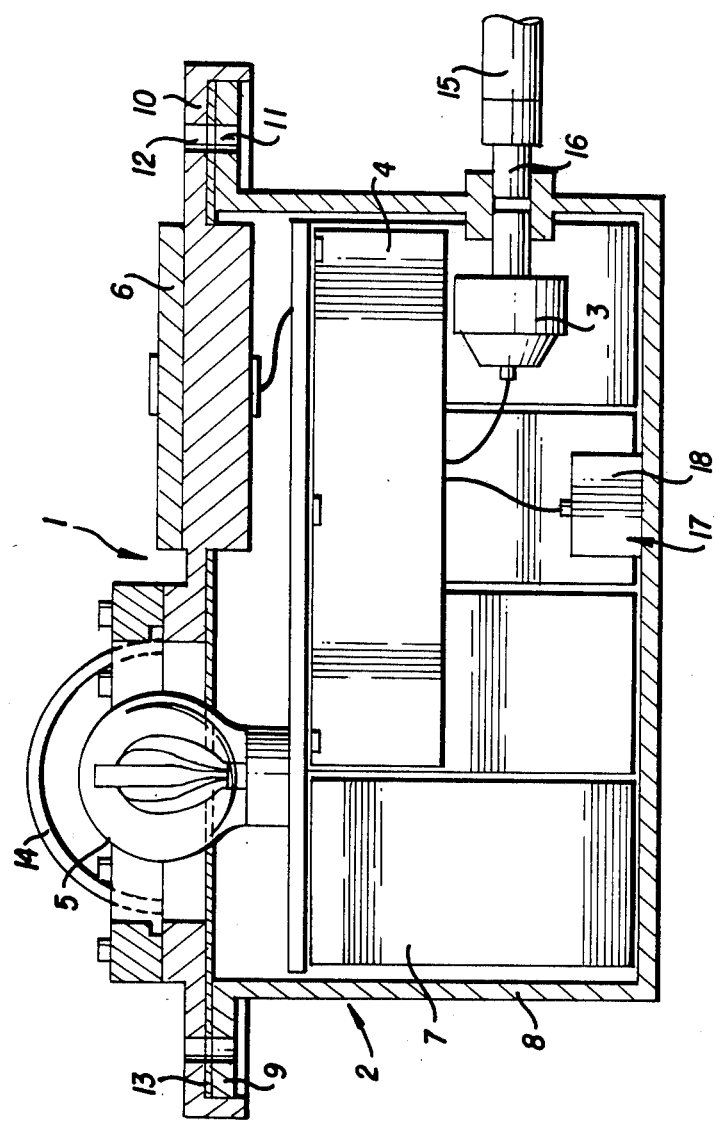

LEAK DETECTORS

This invention concerns improvements in or relating to leak detectors and in particular to leak detectors for flexible hose of the type comprising a main fluid retaining carcass and a secondary fluid retaining carcass enclosing at least part of the length of the main carcass to prevent escape of fluid leaking through the main carcass.

Flexible hose of the type referred to above is particularly useful for transporting fluids the escape of which would constitute a severe health or safety hazard and is especially suited to applications where the hose is required to withstand a considerable amount of flexing in use, rough handling during connecting operations and severe weathering, for example as may occur when the hose is used to transport oil from a tanker moored offshore to an installation onshore.

Although the secondary carcass may be constructed to provide a load bearing capability sufficient to allow operation of the hose to continue unaffected should fluid leak from the main carcass, it is desirable to provide a means of detecting such leakage so that the damaged hose may be replaced before failure of the secondary carcass occurs.

In assignee's U.K. Patent Publication No. 2117480 there is described a flexible hose of the type referred to above provided with a leak detector mounted externally of the hose, preferably on an end fitting to which the hose is connected. Fluid leaking from the main carcass passes to or pressurizes the leak detector which is powered by batteries contained within the detector casing, and is operable to generate a warning signal when the pressure of the leaking fluid exceeds a predetermined value.

The present invention is directed to an improvement in leak detectors of the type described in our U.K. Patent Publication No. 2117480 and comprises the provision of test means for checking the operating capability of the detector, the test means being operable from outside the detector thereby enabling the operating capability of the detector to be checked with detector in situ.

Preferably the test means comprises a switch housed within the detector and actuable from outside the detector by a magnet to operate a light, e.g. a strobe or an LED display, powered by a power source, e.g. batteries, for the detector to give a visual indication of the satisfactory state of the power source and the electrical circuitry of the detector.

The invention will now be described in more detail, by way of example only, with reference to the accompanying drawing wherein the single FIGURE is a side view, partly in section, of a leak detector provided with test means according to the present invention.

The detector 1 shown in the accompanying drawing is a self-contained unit comprising a rigid, pressure resistant watertight casing 2 housing a pressure sensitive electrical switch 3, electrical control unit 4, light 5, acoustic transducer 6 and battery 7.

Casing 2 comprises a rectangular open-top box 8 having a peripheral flange 9 around the opening and cover 10 secured thereto by releasable fastening means (not shown) extending through aligned apertures 11, 12 in the flange 9 and cover 10. A gasket 13 clamped around the periphery thereof seals the casing 2 against ingress of water. Cover 10 includes a detachable pressure resistant transparent dome 14 in which the light 5 is positioned and the acoustic transducer 6 is located alongside the dome 14.

The leak detector 1 as above-described is suitable for use with a hose (not shown) comprising a main fluid retaining reinforcement carcass and a secondary fluid retaining reinforcement carcass disposed radially outwards of the main carcass to retain fluid leaking from the main carcass. A dual carcass hose of this type is described in more detail in our U.K. Patent Publication No. 2117479 to which the reader is directed for further details.

The detector 1 is mounted externally of the hose, e.g. on an end fitting to which the hose is connected, and fluid leaking from the main carcass passes to the pressure sensitive switch 3 via a rigid tube 15 integral with the end fitting and a flexible small bore tube 16 releasably connected to tube 15. When the pressure of leaked fluid reaches a predetermined level the pressure sensitive switch 3 is operable to trigger the control unit 4 which in turn activates the transducer 6 and light 5. The signal produced by the transducer 6 may be used to activate remote visual and/or audio warning devices e.g. on a surface buoy or on a control panel while operation of the light 5 provides a local indication of the hose in which leakage has occurred. The leak detector 1 and operation thereof thus far described is similar to that described in our aforementioned U.K. Patent Publication No. 2117480 to which the reader is directed for further details.

In accordance with the present invention the leak detector 1 is provided with test means 17 for checking the state of the batteries 7. Test means 17 comprises an electrical switch 18 mounted within the casing 2 and operable from outside the casing 2 by means of a magnet placed adjacent to the switch to trigger the control unit 4 which in turn activates the light 5 and transducer 6 powered by the battery 7 as previously described. Operation of the light 5 and transducer 6 provides an indication of the satisfactory state of the battery 7 and the electrical circuitry within the casing 2. The aforedescribed test may be carried out quickly and easily with the detector in situ since only faulty/malfunctioning detectors have to be removed and replaced.

The invention is not restricted to test means as aforedescribed but includes test means in which a switch within the casing is actuated by any other suitable means e.g. an ultrasonic signal from outside the casing.

Also the leak detector may be used in combination with any other construction of hose in which leaked fluid is collected and passed to a leak detector to provide an indication of hose failure.

I claim:

1. A leak detector for mounting externally of a flexible hose and operable in response to the pressure of fluid leaking through at least a part of the flexible hose to generate warning signal, said leak detector comprising test means for checking the operating capability of the detector, and means for operating said test means from outside of the detector.

2. A leak detector according to claim 1 wherein said test means comprises a switch housed within the detector and actuable from outside the detector by a magnet.

3. A leak detector according to claim 1 wherein said test means comprises a switch housed within the detector and actuable from outside the detector by an ultrasonic signal.

4. A leak detector according to claim 1 and comprising visual indication means to indicate the operating capability of the detector.

5. A leak detector according to claim 4 wherein said visual indication means comprises a light source powered by a power source within the detector.

6. A leak detector according to claim 1 wherein the detector comprises a rigid pressure resistant water-tight casing in which the test means is located.

7. A leak detector according to claim 1 wherein the test means is operable to provide an indication of the state of a power source within the leak detector.

8. A leak detector according to claim 1 wherein the test means includes means to provide an indication of the capability of the detector to generate a warning signal in response to a change of fluid pressure applied to the leak detector.

9. A leak detector according to claim 1 operable to activate a remote warning device.

10. A leak detector for mounting externally of a flexible hose and operable in response to the pressure of fluid leaking through at least a part of the flexible hose to generate a warning signal, said leak detector comprising a rigid pressure-resistant water-tight casing wherein is located a power source, a pressure sensitive switch in communication with a passage which extends through the casing, a light, an acoustic transducer, a pressure sensitive switch which is connected to activate the light and acoustic transducer when the pressure sensed by the pressure sensitive switch reaches a predetermined level, and means to operate said test means from outside the casing to cause actuation of the light and acoustic transducer.

11. A flexible hose assembly comprising a flexible hose having main fluid retaining carcass and a secondary fluid retaining carcass secured to a rigid end fitting, and mounted externally of the hose a leak detector operable in response to the pressure of fluid leaking through at least a part of the flexible hose to generate warning signal, said leak detector comprising test means for checking the operating capability of the detector, and means to operate said test means from outside of the detector.

* * * * *